United States Patent [19]
Cardina et al.

[11] Patent Number: 6,151,500
[45] Date of Patent: Nov. 21, 2000

[54] METHOD AND APPARATUS FOR DIRECTING A WIRELESS COMMUNICATION TO A WIRELINE UNIT

[75] Inventors: Donald M. Cardina, Lawrenceville; Charles M. Link, II, Roswell, both of Ga.; Timothy P. Tatem, Longwood, Fla.

[73] Assignee: BellSouth Corporation, Atlanta, Ga.

[21] Appl. No.: 08/879,481

[22] Filed: Jun. 20, 1997

[51] Int. Cl.[7] .................................................. H04B 1/00
[52] U.S. Cl. ........................................ 455/435; 455/560
[58] Field of Search .................................. 455/432, 433, 455/435, 560, 414, 461, 462, 463, 445, 465, 561, 417, 573, 552, 553, 444

[56] References Cited

U.S. PATENT DOCUMENTS

| | | | |
|---|---|---|---|
| 4,736,404 | 4/1988 | Anglikowski et al. | 379/62 |
| 5,526,403 | 6/1996 | Tam | 455/552 |
| 5,592,533 | 1/1997 | Henry et al. | 379/58 |
| 5,933,774 | 8/1999 | Bertocci | 455/417 |

FOREIGN PATENT DOCUMENTS

| | | |
|---|---|---|
| 0740482A1 | 10/1996 | European Pat. Off. . |
| H08-237376 | 9/1996 | Japan .................. H04M 3/58 |
| 2282735 | 4/1995 | United Kingdom . |
| 2284727 | 6/1995 | United Kingdom . |
| WO 9501070 | 1/1995 | WIPO . |

*Primary Examiner*—Reinhard J. Eisenzopf
*Assistant Examiner*—Makoto Aoki
*Attorney, Agent, or Firm*—Jones & Askew, LLP

[57] ABSTRACT

Apparatus, method and system for notifying a communications switching center that a subsequent communication directed to a wireless number associated with the wireless unit is to be routed to a directory number associated with the wireless unit. A converter may be provided and connected to a current source and to a communications switching center. The wireless unit may be connected to the converter, and if connected, the unit draws current therefrom. In response to the draw of current by the wireless unit through the converter, the converter transmits a message to the communications switching center. The message includes a notification that a subsequent communication directed to the wireless number associated with the wireless unit is to be routed to the directory number associated with the wireless unit.

28 Claims, 5 Drawing Sheets

METHOD AND APPARATUS FOR DIRECTING A WIRELESS COMMUNICATION TO A WIRELINE UNIT

FIELD OF THE INVENTION

This invention relates in general to the field of telecommunications. This invention relates in particular to the field of wireless communication routing. Even more particularly, this invention relates to the field of telecommunications systems and methods for directing wireless communications to a directory number associated with a wireline unit rather than to a wireless number associated with a wireless unit. And still even more particularly, this invention relates to an apparatus for registering a wireless unit with a communications switching center so that a subsequent communication directed to a wireless number associated with the wireless unit is routed to a directory number associated with a wireline unit.

BACKGROUND OF THE INVENTION

In recent years, the vast majority of the industrialized world has become telephonically accessible via the public switched telephone network (PSTN). Most commonly, this accessiblity has been implemented through conventional telephone systems. A conventional telephone system may be considered to be and is hereinafter included in the general category of wireline systems, i.e., telecommunications systems that transmit communications over lines such as copper or fiber optic lines. Thus, a unit that operates in a wireline system may be referred to as a wireline unit.

Convenient devices such as cordless telephones have been developed to work with the PSTN and to facilitate communications. The term "cordless telephone" is an appropriate appellation to the device to which the term refers. A cordless telephone is a telephone with no cord between the handset and the base. Each piece typically contains a radio transmitter, a receiver, and an antenna. The handset contains a rechargeable battery; the base plugs into a power source and is functionally connected by a wireline system to the PSTN. As a result of this connection by wireline system to the PSTN, a cordless telephone is considered to be a wireline unit. Advantageously, the cordless telephone allows the user to communicate through use of the handset, and further allows the user to communicate through use of the handset and to range several feet and in some cases up to several miles away from the base. Based on this advantage of mobility, cordless telephones have been welcomed by users and such devices may be found in many homes and other places.

The advantage of communication on the move is also a characteristic of a cellular mobile radiotelephone (CMR) system. But CMR systems typically allow a user a far greater range of movement than cordless telephones. In CMR systems, the user is not tied in any way to a base such as the base used in cordless telephones. In some cases, a CMR system may provide a user with an unlimited range of use. In a typical CMR system, a user makes use of a cellular mobile radiotelephone to receive and transmit communications without being limited to a fixed location. A cellular mobile radiotelephone is also referred to herein as a "cell phone". CMR systems typically operate in addition to and through the PSTN to provide users with these additional communication services and advantages.

The popularity and widespread acceptance of CMR systems have brought about the development of systems that work as an adjunct with CMR systems and with the PSTN.

An example of an adjunct to CMR systems is the fixed wireless (FWL) system. An FWL system allows a user to effectively convert certain conventional telephones into extensions of the user's cell phone. In particular, an FWL system usually includes a cell phone physically connected to one or more conventional telephones within a discrete location, such as a home or office. The FWL system allows the user to make use of the CMR system through the connected conventional telephones. These extensions to the cell phone may provide the user with certain advantages. Yet, these FWL systems do not provide the user with access to the PSTN independently of the CMR system. Such lack of direct access to the PSTN could be critical in the event that one of the wireless communication links, from and including the cell phone to the CMR system, is not functioning properly. Another example of an adjunct to CMR systems is a type of system referred to herein as "base station" technology, but also commonly known as "cellular cordless" technology. Base station technology allows a user to make use of certain aspects of conventional telephone systems and of CMR systems. To utilize this base station technology, a user who has access to the PSTN and who also has access to a CMR system must purchase both a specially equipped base station and a specially equipped cell phone. Such equipment is manufactured by Motorola Inc., 600 North U.S. Hwy 45, Libertyville, Ill. 60048 and available as a Personal Phone Series (PPS) system. The base station is located typically at the user's base of operation, be it a residence, office or the like. The base station is connected to the PSTN and includes a mechanism for detecting the proximal presence of the user's cell phone when that cell phone is within a certain limited geographical distance of the base station. In essence, the base station functions as a cell site which provides a continuous "control channel" in a manner similar to a conventional cell site. The base station is different from the conventional cell site in that it utilizes a non-standard control channel that changes based on internal interference avoidance algorithms. Additionally, the base station uses a narrow band channel with a 200 bits per second data carrier.

Normal operation of the specially equipped cell phone includes a periodic scan of the designated control channel to determine whether the cell phone is within range of the the base station. If so, the cell phone and base station "handshake" in a manner well known in the telecommunications field. The result of the handshake is registration of the cell phone with the base station, which registration triggers an operational switch to the cell phone operating with the base station. The CMR system is then notified of the registration. Typically, the base station then functions as a wireline unit and is assigned a wireline number. Accordingly, after the CMR system is notified of the registration of the cell phone with the base station, the CMR system does not accept or continue handling the communication directed to the number associated with the cell phone in the conventional manner. Instead, the CMR system effectively relinquishes the communication to the PSTN. Thereafter, the communication is routed in a conventional manner through the PSTN to the base station.

In response to receiving the communication through the PSTN, the base station transmits the communication to the cell phone in much the same manner as a communication would be transmitted to a cordless telephone in a wireline system. Effectively, the cell phone functions as a cordless telephone. By this relay of the communication, the CMR system is not involved in connection of the communication. Thus, expenses associated with cellular services and usage fees are obviated with respect to this communication. In other words, even though this communication was initially directed to a number associated with a cell phone, the communication is ultimately connected as a conventional telephone call or wireline call. Thus, the user is not charged cellular service charges for the communication.

In sum, base station technology allows increased flexibility for a user because the user may use a cell phone in a manner that does not incur the significantly higher usage fees typically accompanying cell phone use. The benefits of base station technology, though, are predicated upon several factors. First, the user must purchase a specially equipped cell phone and also purchase an accompanying specially equipped base station. Second, the cell phone must be within proximal range of its base station. Even after these criteria are met, a user must still provide two telephone exchange numbers—one for the cellular service and one for the landline service. Finally, an individual who desires to implement base station technology will, after purchasing the specialized base station and cell phone, likely be left with a conventional cordless phone which is unusable in conjunction with the base station technology.

Accordingly, there is a need to provide a user who has access to the PSTN and also subscribes to a CMR service with a way to receive a wireless communication through a wireline system in a reliable and more cost-efficient manner than currently available. Specifically, there is a need to provide such a service without requiring purchase of a specially equipped cell phone or a specially equipped base station. Furthermore, there is a need to provide such a service without requiring a user to provide different telephone exchange numbers to individuals who may be interested in calling the user at a "home" location. Finally, there is a need to provide such a service that will incorporate existing personal communication hardware, such as conventional cordless phones, rather than replace them, thereby rendering such devices obsolete.

SUMMARY OF THE INVENTION

The present invention allows a user who has access to both a wireline system and a wireless system to receive a wireless communication at a home or other predetermined fixed location in the manner of typical wireline service. More particularly, the present invention provides methods, systems and apparatuses for registering or otherwise making use of a wireless unit. By this registration or use, a subsequent communication directed to a wireless number associated with the wireless unit is routed so that the communication may be received at the predetermined fixed location in the manner of typical wireline service. Advantageously, the present invention provides telecommunications services conveniently and inexpensively. More particularly, the present invention provides a user who has access to the PSTN and also subscribes to a CMR service with a way to receive a wireless communication through a wireline system in a reliable and more cost-efficient manner than currently available.

Specifically, the present invention provides multiple benefits to a user. First, an individual who subscribes to both wireless and wireline services receives the financial benefit of receiving a communication as if it was a wireline communication Specifically, a caller may know only the user's wireless number and be unaware of the user's wireline directory number. Second, the present invention provides such a capability without requiring purchase of a specially equipped cell phone or a specially equipped base station. Furthermore, the present invention is configured such that it can readily incorporate existing personal communication hardware, such as conventional cordless phones.

As noted above, the present invention provides exemplary methods, systems and apparatuses for making use of a wireless unit so that a subsequent communication directed to a wireless number associated with the wireless unit is routed to a directory number associated with a wireline unit. Preferably, this wireline unit may be associated with the wireless unit in some manner such as through a converter. Alternatively, the wireline unit may be the wireless unit as it operates in association with a converter or other device to receive and transmit wireline communications.

More particularly, an exemplary method includes steps for notifying a communications switching center so that a subsequent communication directed to a wireless number is routed to a directory number associated with a wireline unit. These steps include making a connection between a converter and a device such as a wireless unit. This may be a physical connection. These steps also may include connecting the converter to a current source and to the communications switching center. If the device is a wireless unit, then the wireless unit is connected to the converter. In response to the connection of the wireless unit to the converter, the wireless unit may draw current from the converter.

In any case, in response to the connection of the device to the converter, the converter makes a detection of the connection. This detection may be a detection of a substantially continuous connection over a predetermined period of time between the converter and the device. If the device is a wireless unit that draws current from the converter, then the converter detects the current being drawn by the wireless unit. This detection may include the detection of current being drawn substantially continuously by the wireless unit over a predetermined period of time. In response to the detection, the converter transmits a message to the communications switching center. The message includes a notification that a subsequent communication directed to the wireless number be routed to the directory number associated with a wireline unit Also more particularly, another exemplary method includes other steps for notifying a communications switching center so that a subsequent communication directed to a wireless number is routed to a directory number associated with a wireline unit. These steps include functionally connecting a converter to a communications switching center. The converter detects the actuation of a switch. In response to the detection, the converter transmits a message to the communications switching center. The message includes a notification that a subsequent communication directed to the wireless number associated with the wireless unit be routed to the directory number associated with the wireline unit.

The present invention also provides an exemplary system for instructing a communications switching center to direct a wireless communication to a directory number associated with a wireline unit. This system includes a converter functionally connected to the communications switching center. The converter also may be functionally connected to a current source. The system also includes a wireless unit having a wireless number and being operative to form an association with the converter. The association between the converter and the wireless unit may be a connection maintained substantially continuously over a predetermined period of time. The association may be a physical connection between the wireless unit and the converter. The wireless unit may be operative to draw current from the converter. The association then may include a detection by the converter of the current being drawn by the wireless unit. In addition, the converter is further operative to respond to the association with the wireless unit by transmitting a message to the communications switching center. The message includes a notification that a subsequent communication directed to the wireless number be routed to a directory number associated with a wireline unit.

In addition, more particularly, the present invention includes an exemplary apparatus for registering a wireless unit with a communications switching center so that, responsive to a triggering event, a subsequent communication directed to a wireless number associated with the wireless unit is routed to a directory number associated with a wireline unit. This apparatus includes a detector and a functionally connected transmitter. The detector makes a detection of a triggering event. In response to the detection of the triggering event, the detector is operative to provide a signal to the transmitter. In response to the signal from the detector to transmit a message to the communications switching center, the transmitter transmits a message. This message includes a notification that a subsequent communication directed to the wireless number associated with the wireless unit be routed to the directory number associated with the wireline unit.

This exemplary apparatus may further provide that the detector is further operative to detect a disassociation of the triggering event. The disassociation of the triggering event may include the actuation of a switch. In response to the detection of the disassociation, the detector provides a disassociation signal to the transmitter. Then the transmitter responds to the disassociation signal by transmitting a disassociation message to the communications switching center. The disassociation message includes an instruction to route the subsequent communication directed to the wireless number to the wireless unit.

Further, more particularly, the present invention provides another exemplary apparatus for notifying a communications switching center so that a subsequent communication directed to a wireless number associated with a wireless unit is routed to a directory number associated with a wireline unit. This apparatus includes a power supply, a detector and a functionally connected transmitter. The detector monitors current drawn from the power supply. In response to the detection of an increase of current drawn from the power supply, the detector provides a signal to the transmitter. In response to the signal from the detector to transmit a message to the communications switching center, the message includes a notification that a subsequent communication directed to the wireless number associated with the wireless unit be routed to the directory number associated with the wireline unit.

Accordingly, it is an object of the present invention to provide individuals with the ability to convert incoming wireless communications to communications which are received in the manner of conventional wireline communications.

It is a further object of the invention to provide a method and apparatus for converting incoming wireless communications to wireline communications without requiring the purchase of a specialized telephone or base station.

Still another object of the present invention is to readily incorporate existing personal communication hardware, such as conventional cordless phones, into the operation of the present invention.

Yet another object of the invention is to provide such a method and apparatus which performs the conversion upon the occurrence of a triggering event such as the detection of current drawn from the converter.

It is also an object of the invention is to allow cellular and wireline service providers a way to account for and control use of such a method and apparatus by a user, thereby generating revenue from such use.

That the present invention and the preferred embodiments thereof overcome the drawbacks set forth above and accomplish the objects of the invention set forth herein will become apparent from the detailed description of the preferred embodiments to follow.

DETAILED DESCRIPTION

Introduction

The present invention provides methods, systems and apparatuses for routing a communication directed to a wireless number to a directory number associated with a wireline unit. To implement this invention, a wireless unit may be connected to a converter or a switch on a converter may be activated. In response, the converter transmits a message to a communications switching center. The message has the effect of providing call routing information with respect to subsequent communications directed to the wireless number associated with the wireless unit connected to the converter. In particular, a subsequent communication directed to the wireless number associated with the wireless unit is routed so that the communication may be received at a predetermined fixed location in the manner of typical wireline service. In essence, the present invention "converts" a communication directed to a wireless number associated with wireless unit into a communication that is directed through the wireline system to a directory number associated with a wireline unit.

Stated generally, the present invention includes a converter which detects a triggering event such as the connection of a device, the actuation of a switch, the detection of light or absence of light or other triggering event. In response to the detection, the converter transmits a message to a communications switching center such as may be associated with the wireless system. The message includes a notification that a subsequent communication directed to a particular wireless number be routed to the directory number associated with a particular wireline unit. The converter is described in detail below in connection with FIGS. 2, 3A, and 3B. The referenced device may include a wireless unit. As noted above, a wireless unit is used as a communication tool in a wireless system. Such wireless units may include cell phones, and a cell phone is used for the sake of examples in providing a description of the present invention.

Advantageously, the present invention may be used with most types or brands of cell phones. But the term "device" or "wireless unit" should not be limited to a cell phone. The present invention also may be used with appropriate configurations with other types of wireless units such as personal communication service (PCS) units, etc. Further, it will be appreciated that a communication or call is directed to a wireless unit by way of dialing or otherwise inputting a wireless number associated with the wireless unit. In other words, to place a call to a wireless unit, a caller dials the wireless number of the wireless unit. The call then is processed or routed based on this wireless number. To readily differentiate herein a number associated with a wireline unit from a wireless number associated with a wireless unit, the term "directory number" is used with respect to the number associated with the wireline unit. Thus, a communication is directed to a wireline unit by way of dialing or otherwise inputting a directory number associated with the wireline unit. The call to the wireline unit then is processed or routed based on the directory number.

To describe exemplary embodiments of the present invention, a CMR system is used as an example of a wireless system. But a wireless system should be understood to include other radio telephony systems such as PCS systems, global standard for mobile communications (GSM) systems, and other such systems. With appropriate configurations, the present invention may be used in such other systems.

Figure 1:
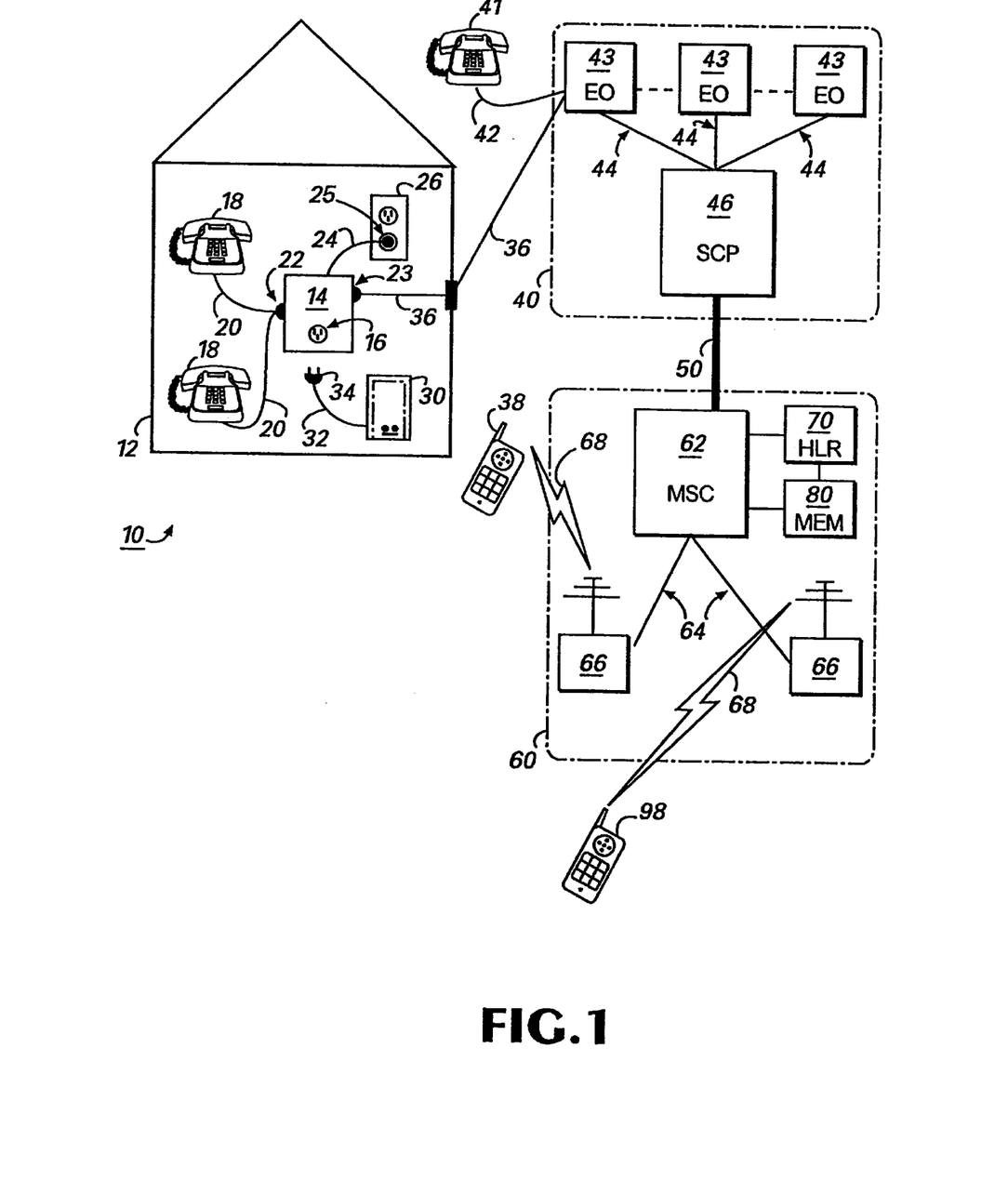
FIG. 1 is a block diagram illustrating the preferred environment for an exemplary embodiment of the present invention.

FIG. 1—A Preferred Environment For Present Invention

FIG. 1 is a block diagram illustrating a preferred environment for an exemplary embodiment of the present invention. The communications system 10 operates in conjunction with the PSTN 40 and the CMR system 60 so as to take advantage of an existing wide area communications network. The communications system 10 adapts the existing environment of the CMR system 60 to communicate voice or data information via the PSTN 40 in a manner which had previously only been achievable through use of more burdensome and expensive communication means such as home base stations and specially equipped radiotelephones such as the cellular cordless units described in the background.

The CMR system 60 typically includes a radio coverage area divided into smaller coverage areas known as a "cells" using low power transmitters and coverage-restricted receivers. As will be known to those skilled in the art, the limited coverage area allows the radio channels used in one cell to be reused in another cell. As a cell phone within one cell moves across the boundary of the cell and into an adjacent cell, control circuitry associated with the cells detects that the signal strength of the cell phone in the just-entered cell is stronger than in the just-left cell. Communications with the cell phone then are "handed off" to the just-entered cell. A plurality of cells are typically provided in a conventional CMR system. Conventional CMR systems typically include at least one mobile telephone switch which also may be commonly referred to as a communications switching center, mobile switching center ("MSC") or mobile telecommunications switching office (MTSO). As illustrated in FIG. 1, MSC 62 is coupled to an appropriate array of more or less identically equipped cell sites 66. Each cell site 66 can access at least one MSC 62. The MSC 62 couples communications involving cell phones operating in the MSC's cells to the PSTN 40 via communications link 50. Of course, the MSC 62 may also couple communications from one cell phone to other cell phones operating within the CMR system 60.

The MSC 62 communicates with a particular cell phone 38 operating within the CMR system 60 by a communications link 64 to a cell site 66. The cell site 66 exchanges communications with cell phone 38 via a communications airlink ("airlink") 68. A communication directed to a cell phone 38 and originating from either a device such as a conventional telephone 41 operating through the PSTN 40 via communications link 42, or another cell phone 98 operating within the CMR system 60 is received by the MSC 62. In response, the MSC 62 relays the communication to one or more cell sites 66 in which the cell phone 38 of the intended recipient of the communication was last registered. Transmission of the communication from the cell site 66 to the cell phone 38 occurs via airlink 68.

The PSTN 40 referenced in the exemplary embodiment of the communications system 10 includes Advanced Intelligent Network (AIN) elements as described generally in U.S. Pat. No. 5,430,719 to Weisser, Jr., which is incorporated by reference herein. Elements taught therein should be regarded as elements of the PSTN 40. Nonetheless, the PSTN 40 need not necessarily include AIN elements for implementation of the present invention. For the purpose of the discussion of the present invention, it is noted that PSTN 40 includes a plurality of communicatively connected end offices 43 accessible by the CMR system 60. A communication can be initiated via the PSTN 40 by connection to the end offices 43 of a variety of wireline devices 41, including telephones and facsimile machines, by a wireline connection 42.

FIG. 1 further illustrates a preselected fixed location 12 such as a home that is connected through communications link 36 to the PSTN 40. Typically, communications link 36 is a link of a wireline system. As is explained in greater detail below through the use of explanatory examples, the preselected fixed location 12 typically includes a number of elements. These elements may include wireline devices 18 such as home telephones. These wireline devices 18 are connected by well known modular connector(s) 22 to a converter 14 and then to the communications link 20 for functional connection to the PSTN 40 as well as to the CMR system 60 and elements thereof such as the communications switching center (MSC) 62.

FIG. 1 further illustrates that the converter 14 may be connected to a current source (not illustrated) by being plugged into a conventional electrical outlet 26. Other types of connections will occur to those skilled in the art. As also illustrated in FIG. 1, a device such as battery charger 30 may be connected to the converter 14. Typically, the battery charger 30 may be any conventional type of battery charger used in connection with a wireless unit such as a cell phone as illustrated by cell phone 38. The battery charger 30 may be connected to the converter 14 in the same manner as the battery charger 30 would be plugged into a conventional electrical outlet 26. Other types of connections will occur to those skilled in the art When the battery charger 30 is plugged into the converter 14, the battery charger 30 draws current and recharges batteries as necessary transparently through the converter 14 from the current source (not illustrated).

FIG. 1—An General Example of an Exemplary Embodiment

A general example of an exemplary embodiment of the present invention is now provided with respect to the processing of a communication directed to a wireless number associated with wireless unit 38. For purposes of this general example, assume that wireless unit 38 is connected to its battery charger 30 which in turn is connected to converter 14. As a result of this connection of the wireless unit 38 to the converter 14, the converter 14 had transmitted a message through communications link 36, through the PSTN 40, and to the communications switching center (MSC) 62 in the CMR system 60. In turn, the MSC 62 provided the message to the memory cell 80. Effectively, this message provided a notification that a subsequent communication directed to the wireless number associated with the wireless unit 38 be routed to the directory number associated with a wireline unit 18. Additional details regarding this connection, detection and message transmission process are explained in the example below and in connection with FIGS. 2, 3A, and 3B.

Reference is made again to the example of the processing of a communication directed to a wireless number associated with wireless unit 38. Such a communication is processed through the typical CMR system 60 and the cells 66 to a typical cell phone 38 through a plurality of communication switching centers, such as the MSC 62. For example, assume that a first individual, Chuck, desires to speak to a second individual, Don. Assume that Don is associated with the cell phone 38 which is plugged by way of the battery charger 30 into the converter 14 in the preselected fixed location 12, i.e. Don's house. Assume that Chuck places the communication to Don by dialing the wireless number of the cell phone 38 from a cell phone 98 operating within the CMR system 60. This communication is received, via airlink 68, by the cell site 66. The cell site 66 routes Chuck's call to the MSC 62 via a communications link 64. Upon receipt of Chuck's communication by the MSC 62, the MSC 62 queries a memory device such as a home location register (HLR) 70 for the last known location of Don's cell phone 38.

The HLR 70 is programmed with a variety of information relating to subscribers to the CMR system 60, such as Don. This information may include default information as to the permanently registered primary location of the cell phone 38. Don's primary registration location may be, for instance, the particular cell in which he lives or works. The HLR 70 also serves as a semi-volatile database for recording the last location in which Don used his cell phone 38. When Don turns his cell phone "on" and at other appropriate times, the cell phone 38 registers itself with the CMR system 60. This registration information is provided ultimately to the HLR 70. Typically, each new location registration of the cell phone 38 replaces the previously stored location registration. Thus, information stored in the HLR 70 may reveal, upon query, both Don's permanent registration location and his last known location registration.

Additionally, the HLR 70 will, prior to forwarding Chuck's communication to Don's cell phone 38 via the CMR system 60, determine whether Don subscribes to any special services which may alter the method or manner of delivery of Chuck's communication to Don. Specifically, if Don is an authorized user of an embodiment of the present invention, Chuck's communication to Don may not be completed over the CMR system 60 in the conventional manner. For the purposes of this description, an authorized user of the present invention typically is an individual, such as Don, who has obtained the necessary elements and/or services associated with the present invention and has registered or otherwise appropriately informed the service provider(s) of his or her wireless and/or wireline preferences. Of course, an authorized user may also include any entity other than an individual such as a computer that may be used in connection with the receipt or transmission of communications and that otherwise satisfies the definition provided above. Further, other factors may affect the status of an individual or other entity with respect to qualifying as an authorized user. Through the registration or other information that an authorized user provides to the appropriate service provider, certain information may be stored or associated with other information by the present invention as will become clear through the discussion below. This stored or associated information may be used in implementation of various embodiments of the present invention.

For example, assume that Don is an authorized user of services associated with the present invention and that such use is associated with Don's home 12. For this example, assume that Don became an authorized user by obtaining and installing a converter 14 in his home 12. In particular, the converter 14 is installed simply by a connection to a current source (not illustrated) via electrical cord 24 to a power plug or electrical outlet 25. In addition, the converter 14 is functionally connected through communications link 36 and the PSTN 40 to a communications switching center such as MSC 62. Further, assume that Don supplied information to the appropriate service provider(s) regarding the routing of communications to him. For example, such information may provide routing instructions for the times that Don's cell phone 38 is plugged into his converter 14 (by way of battery charger 30). When Don's cell phone is plugged in at home, then Don may prefer and specify that a communication directed to a wireless number associated with his cell phone 38 be forwarded to a directory number associated with his wireline units 18. By this implementation, Don avoids cellular service charges on communications that are forwarded in this manner to his wireline units.

Typically, this routing information as may be provided by Don is stored in a wireless network element such as memory cell 80 as is described in greater detail in the following paragraphs. In particular, an entry is made by the appropriate service provider in memory cell 80 indicating Don's entitlement to services associated with respect to the forwarding of communications directed to the wireless number of Don's cell phone 38. This entry may also include information such as the directory number of a wireline unit to which a communication is to be forwarded. For example, an entry associated with Don's subscription may include the directory number associated with wireline unit 18 as the number to which communications are to be forwarded if the service is activated. Preferably, this forwarding service is activated upon receipt of a message at the communications switching center (MSC) 62 from a converter 14 including the appropriate notification of activation.

Reference again is made to the example of Chuck's communication to Don. As noted, upon receipt by the HLR 70 of a query by the MSC 62 for routing instructions with respect to Chuck's communication, the HLR 70 ascertains whether Don subscribes to special services such as provided in connection with the exemplary embodiments of the present invention and as to whether such special services are activated. As noted, such services may affect routing of Chuck's communication. Subscription and activation of such services are discovered by the HLR 70 upon query of the memory cell 80 which provides specific information as to communication routing. Although memory cell 80 is depicted in FIG. 1 as separate from MSC 62 and HLR 70, it is understood and appreciated that its functions and functionality may be combined with or incorporated into either the MSC 62 or HLR 70.

In addition to storing information related to Don's entitlement and activation of special services, memory cell 80 may also perform authentication of communications received from Don's converter 14. This authentication may be accomplished by any one of a wide variety of well known authentication procedures, such as a "seed and response" type.

In operation, Chuck's call to Don is, as previously specified, received by the MSC 62 and the HLR 70 is queried for instructions with respect to routing of the call. In the configuration of the present invention depicted in FIG. 1, the HLR 70 queries the memory cell 80 as to whether Don is a subscriber to a specialized service, such as that provided to authorized users of the converter 14 or associated services, and whether Don's forwarding service has been activated. In the current example, Don is an authorized user and the forwarding service has been activated as explained above. Thus, the memory cell 80 provides a response with respect to Don's desires for routing of his communications. For example, Don's status as an authorized user allows him to choose to have certain communications forwarded. In particular, Don may specify that communications that are initially directed to the wireless number associated with Don's cell phone 38 be forwarded to a directory number associated with his wireline units 18. In other words, Don may specify that a communication that is initially directed to his cell phone 38 be forwarded to a wireline unit 18 where Don may accept the communication as a call in the wireline system rather than the wireless system.

If Don had not been an authorized user of the converter 14 or if the forwarding service had not been activated, then Chuck's call would have been forwarded to Don in the manner of conventional cellular communications. Similarly, if Don had not indicated his desire for handling communications directed to his wireless unit 38 in an alternate manner, Chuck's call would have been forwarded in the conventional cellular manner.

Assume Don has specified that communications that are initially directed to the wireless number associated with Don's wireless unit 38 be forwarded to a directory number associated with a wireline unit 18. Thus, in response to Chuck's communication, the HLR 70 obtains the appropriate routing information from memory cell 80. This routing information typically includes the directory number associated with the wireline unit 18 in Don's home 12. This routing information then is forwarded from the HLR 70 to the MSC 62. In turn, the MSC 62 forwards Chuck's call to the PSTN 40 via communications link 50. At this point, the MSC 62 effectively takes itself and the CMR system 60 in general out of the loop with respect to Chuck's communication. The communication is thereafter routed as if it had been initially directed to the directory number associated with Don's wireline unit 18. In this manner, Don avoids cellular service fees that otherwise would have been associated with the communication. In particular, in the PSTN 40, the SCP 46 may determine which of the plurality of end offices 43 provide the most advantageous wireline connection to Don's wireline unit 18. The SCP 46 then provides instructions to route Chuck's call, via communications link 44, to the appropriate end office 43. Chuck's communication is then forwarded, via communications link 36 to Don's wireline unit 18. Don then may answer Chuck's communication on one of his wireline units 18, which may be connected by a well known modular connector 22 to converter 14 by communications link 20. Advantageously, by having communications directed to his cell phone 38 forwarded to his wireline units 18, Don avoids cellular service fees.

Figure 2:
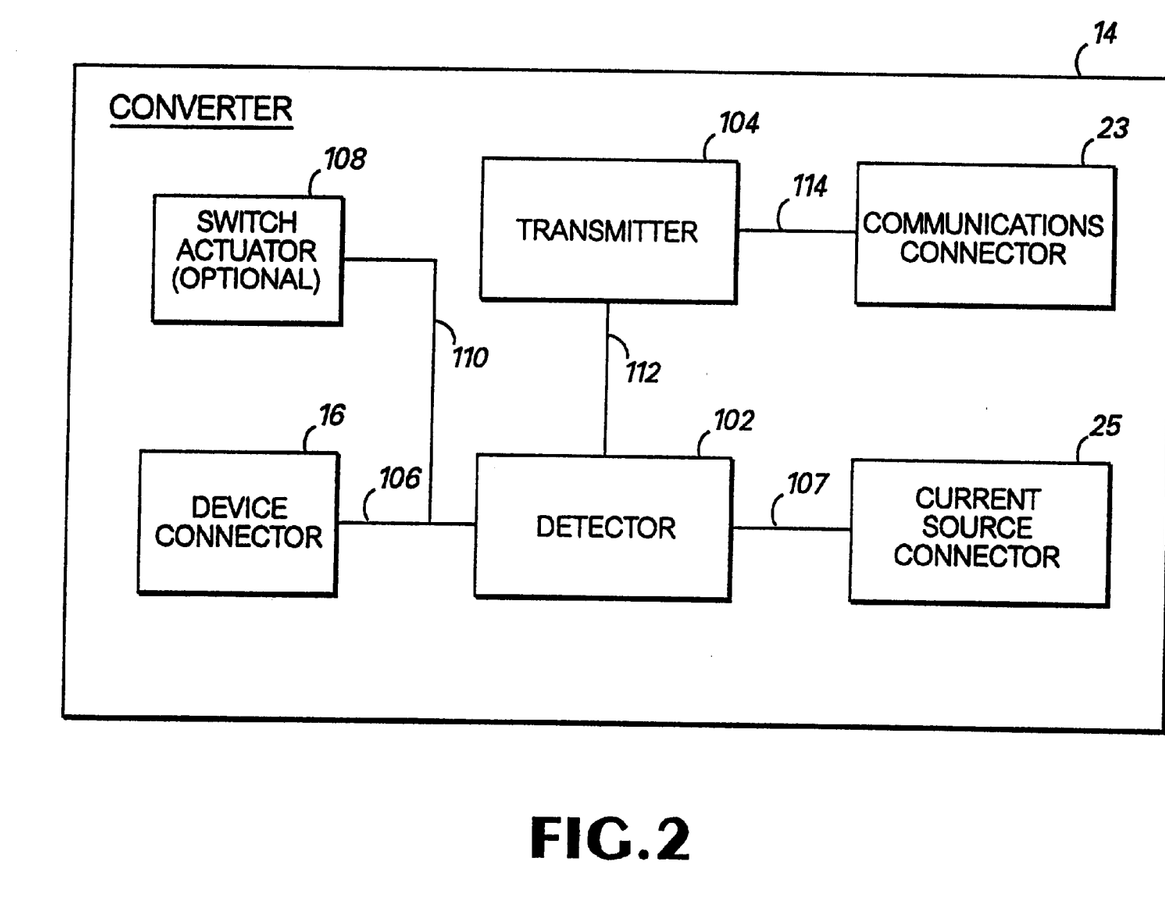
FIG. 2 is a block diagram illustrating an exemplary embodiment of the converter of the present invention.
Figure 3A:
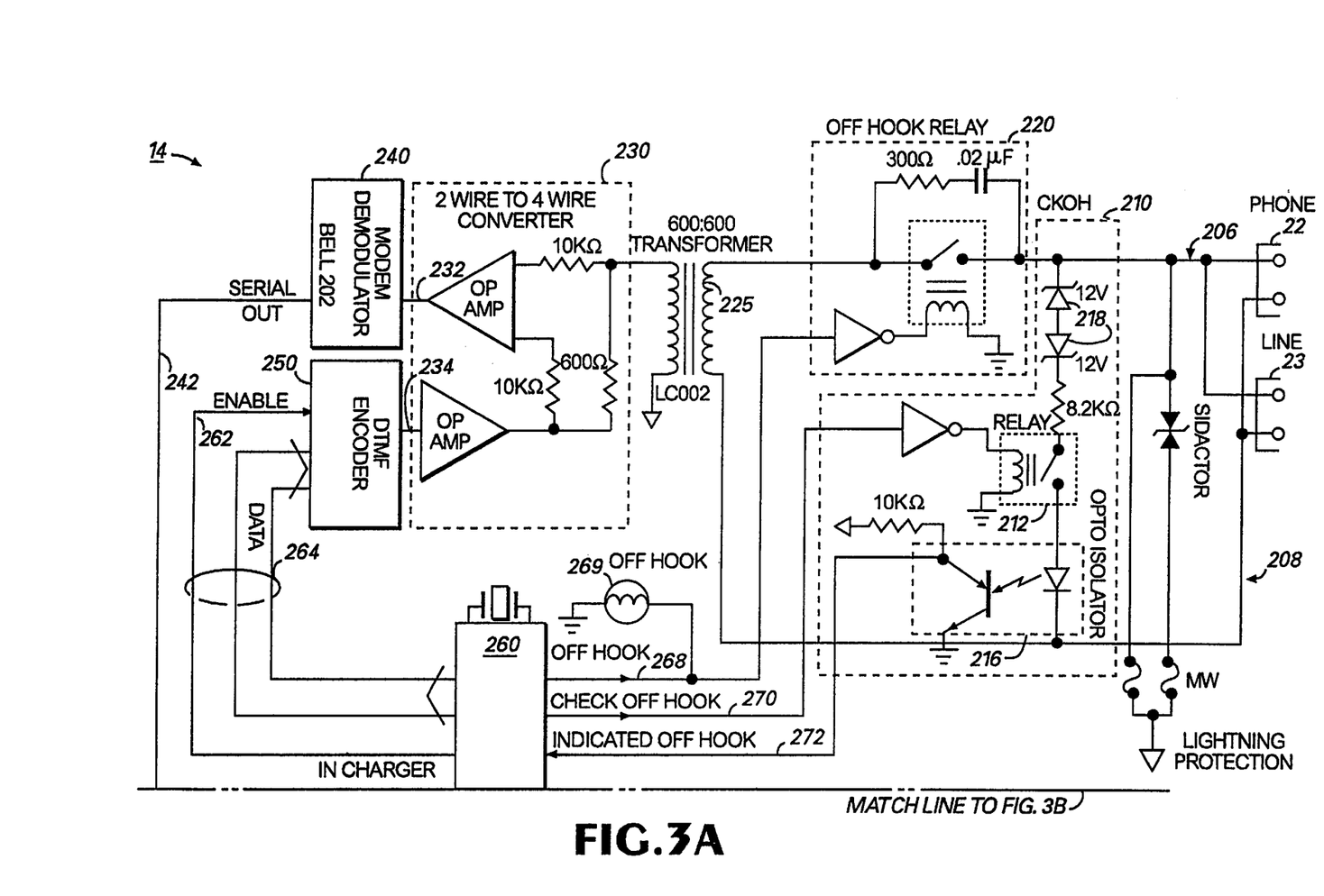
FIGS. 3A and 3B are a schematic diagram illustrating an exemplary embodiment of the converter of the present invention.
Figure 3B:
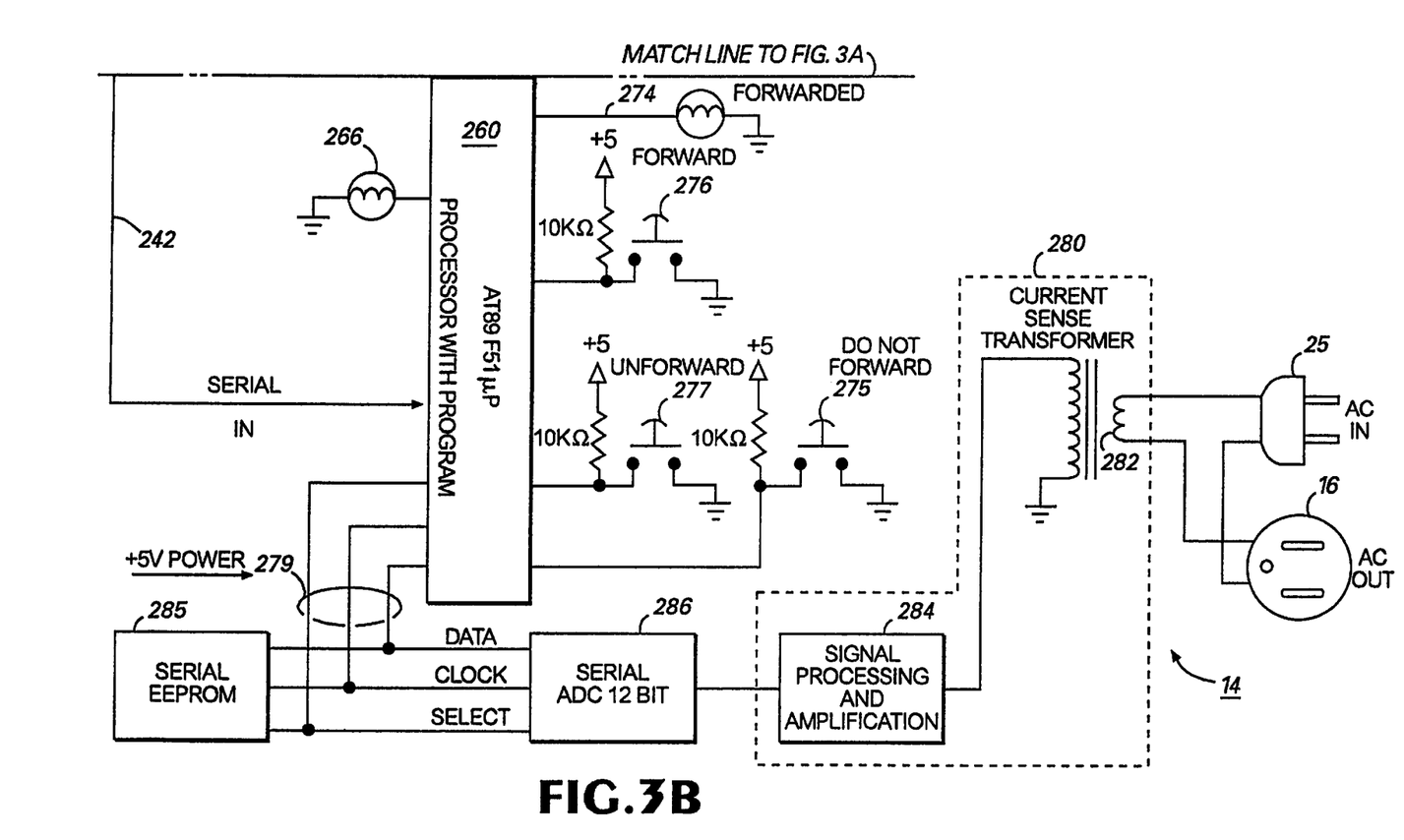

Additional details regarding the operation of the converter 14 and its interaction with the other elements and processes are now presented with reference to FIG. 2 and afterwards with reference to FIGS. 3A and 3B.

FIG. 2—Exemplary Embodiment of the Converter in General Terms

FIG. 2 is a block diagram illustrating an exemplary embodiment of the converter 14 of the present invention. The converter 14 generally may be considered to be an apparatus providing a notification to a communications switching center so that a subsequent communication directed to a wireless number associated with a wireless unit is routed to a directory number associated with a wireline unit.

As illustrated in FIG. 2, the converter 14 generally includes a detector 102 which is functionally connected to a transmitter 104. Generally stated, the detector 102 makes a detection of a triggering event. Such a triggering event may include the detection of a connection of the converter 14 to a device such as a wireless unit 38. This connection may be made through the device connector 16 which is connected by link 106 to detector 102. An example of a device connector 16 is an AC receptacle or output receptacle which may be operative to receive a mating portion of a power plug for ultimate connection through the converter 14 including a current source connector 25 to a current source (not illustrated). The connection may be a direct connection between the converter 14 and the device being connected. Optionally, the connection may be an optical detector for detecting the presence of the cell phone, a mechanical detector triggered by the weight of the cell phone, a magnetic or Hall effect detector for detecting the presence of a magnet in or on the cell phone or another magnetic field, a metal detector for detecting a field change by the cell phone, or a passive infrared receiver (PIR) for detecting either the physical presence of the cell phone, or a human. Typically, though, the connection is an indirect connection such as through an intermediate device like a battery charger 30.

As noted, one of the triggering events mentioned above may include the detection of a connection of the converter 14 to a device such as a wireless unit 38. This connection may be a physical connection, a functional connection, a direct connection or an indirect connection. As is explained in greater detail in connection with FIGS. 3A and 3B below, as a result of the connection of the wireless unit to the converter 14, the wireless unit typically draws current. Thus, a triggering event may further include the draw of current by the wireless unit. For example, the detector 102 is illustrated in FIG. 2 as connected by link 107 to current source connector 25. This current source connector 25 may be an AC plug which is plugged into a standard electrical outlet and thereby connects the converter 14 to a current source. If a wireless unit is connected to the converter 14 by way of the device connector 106, then the wireless unit draws current from the current source via the current source connector 25, link 107, detector 102, link 106 and device connector 106. The detector 102 detects the draw of current by the wireless unit. Thus, the draw of the current by the wireless unit or the detector thereof by the detector 102 may constitute a triggering event.

In addition to the types of triggering events mentioned above, a triggering event may include actuation of a switch. For example, converter 14 may include a switch actuator 108 that is connected by link 110 to detector 102. By actuating the switch actuator 108 such as by flipping a switch, pressing a button, or providing some other input, the switch actuator 108 may provide a signal over link 110 to detector 102 that the switch actuator 108 has been actuated. This actuation may constitute a triggering event.

In response to the detection of the triggering event, the detector 102 provides a signal to the transmitter 104 over link 112. In response to the signal from the detector 102, the transmitter 104 transmits a message to a communications switching center (see FIG. 1). The message includes a notification that a subsequent communication directed to the wireless number associated with the wireless unit be routed to the directory number associated with the wireline unit. Typically, the transmitter 104 transmits the message over link 114 to a communications connector 23. Preferably, this communications connector 23 connects the converter 14 to the PSTN. The communications connector 23 may be a standard modular telephone jack. Alternatively, the communications connector 23 may connect the converter 14 to other systems or elements as appropriate, and in that case, the communications connector 23 may be of a type most appropriate to make the necessary connection.

In an alternate embodiment, the detector 102 may be operative to detect a disassociation of a triggering event as well as the triggering events discussed above. The disassociation of a triggering event may be thought of as the opposite of the triggering event. For example, if a triggering event includes the detection of a connection of the converter 14 to a device, then the disassociation of this triggering event may be the detection of the disconnection of the converter 14 from the device. As another example, assume that a triggering event includes the draw of current by the wireless unit. Then the disassociation of this triggering event may be the detection of the discontinuance of the draw of current or the discontinuance of the draw of current. As yet another example, if the triggering event is the actuation of a switch, then the disassociation of this triggering event may be the deactuation of the switch. Alternatively, this disassociation may include another actuation of the switch based on the premise that a switch toggles from a first position to a second position.

Still referring to this alternate embodiment, the detector 102 may respond to the disassociation or to the detection of the disassociation. The detector 102 may provide a disassociation signal over link 112 to the transmitter 104. In response to receipt of the disassociation signal, the transmitter 104 may transmit a disassociation message to the communications switching center (see FIG. 1). The disassociation message may include an instruction to route the subsequent communication directed to the wireless number to the wireless number. In other words, this disassociation message may provide an instruction that effectively cancels the forwarding service discussed earlier. In this manner, if a user disconnects his or her wireless unit from the converter 14, then in certain circumstances a message may be provided to the communications switching center to resume routing communications to the wireless number through the CMR system. In other words, the user has converted his or her cell phone from an adjunct to his or her wireline units to a cell phone.

Additional details regarding the operation of the converter 14 and its interaction with the other elements and processes are now presented in greater detail with reference to FIGS. 3A and 3B.

FIGS. 3A and 3B—Exemplary Embodiment of the Converter in Greater Detail

FIGS. 3A and 3B are a schematic diagram illustrating an exemplary embodiment of the converter 14 of the present invention. The converter 14 generally includes a "check-off-hook" circuit 210, an off-hook relay 220, an isolating transformer 225, a hybrid converter 230, a demodulator 240, an encoder 250, a processor 260, current sense circuit 280 and other elements as are illustrated in FIGS. 3A and 3B and described herein. Comparing the block diagram of FIG. 2 to this schematic diagram of FIGS. 3A and 3B, the following comparisons of corresponding elements may be made:

| FIG. 2 | FIG. 3 |
| --- | --- |
| detector 102 | current sense circuit 280 |
| transmitter 104 | processor 260 |
| device connector 16 | AC out 16 |
| communication connector 23 | modular connector 22 and communications connector 23 |
| current source connector 25 | current source connector 25 |

Other comparisons will be apparent to those skilled in the art. These comparisons are made for ease of reference in understanding the exemplary embodiment illustrated in FIGS. 3A and 3B. The elements of the block diagram of FIG. 2 are not to be limited to their comparative implementations as illustrated in FIGS. 3A and 3B. Those elements may implemented in any manner as will occur to those skilled in the art to further their intended purpose as described herein.

Referring again to FIGS. 3A and 3B, the converter 14 is functionally connected to the PSTN 40 by communications connector 23, which may be a standard modular telephone jack. In particular, the communications connector 23 is connected to communications link 36 (see FIG. 1) such as standard telephone wire 36. The two poles 206 and 208 of the telephone wire 36 support dual functionality. Specifically, these poles 206 and 208 are routed both to another communications connector 22 such as modular telephone jack 22 for connection to a wireline unit 18. In parallel, these poles 206 and 208 also are routed to the internal circuitry of the converter 14. For the purposes of illustration, wireline unit 18 may be referred to hereinafter as telephone 18. Nevertheless, wireline unit 18 may include any device which may receive communications or signals of any type via a telephone line 36.

Check-Off-Hook Circuit

The check-off-hook circuit 210 is connected across the two poles 206 and 208 of the telephone line 36. The check-off-hook circuit 210 monitors use of the telephone line 36 so that no converter activity takes place that would cause undesirable interruptions to any communications in progress. In particular, the check-off-hook circuit 210 monitors use of the telephone line 36 by monitoring the voltage across the poles 206 and 208. When the telephone line 36 is not in use (the telephone 18 is "on hook"), the voltage across the poles 206 and 208 of the telephone line 36 may be approximately 48 volts. When the telephone line 36 is in use (the telephone 18 is "off hook"), the voltage across poles 206 and 208 of the telephone line 36 may be approximately 6 volts. The check-off-hook circuit 210 uses this difference in potentiality between the on hook and off hook operating states of the telephone line 36 to determine whether the telephone line 36 is in use. If the telephone line 36 is in use, activation of the converter 14 may disrupt ongoing communications. The converter 14 implements a check-off-hook circuit 210 to avoid such undesirable interruption.

One aspect of the check-off-hook circuit 210 is a check-off-hook relay 212. Immediately prior to attempting to make a call, the converter 14 activates the check-off-hook relay 212. If the telephone line is in use, the potential across poles 206 and 208 is approximately 6 volts or not more than 12 volts. If the telephone line is not in use, the potential across poles 206 and 208 is approximately 48 volts or not less than 12 volts. When the check-off-hook relay 212 is in the closed position as a result of a pending telephone call, and the telephone line is in use, the opto-coupler circuit 216 is not activated. The converter 14 cannot interrupt activity on the telephone line 36. If none of the telephones 18 are in use, the converter 14 may become operational because the potential across poles 206 and 208 activates the opto-coupler when the check-off-hook relay 212 is in the closed position immediately prior to a pending telephone call.

Typically, the converter 14 automatically becomes operational by detecting an increase in AC current supplied to the AC outlet 16 as a result of connecting wireless unit 38 to the battery charger attached to AC outlet 16. Optionally, the converter 14 may be placed in an operational condition manually by the user such as through the use of an on/off switch. Such manual activation of the converter 14 is advantageous for routing incoming cellular communications to a wireline unit 18 when the wireless unit 38 is not functionally connected to the converter 14.

When none of the telephones 18 connected to the telephone line 36 are in use, the on hook voltage across the poles 206 and 208 of the telephone line 36 is approximately 48 volts, as discussed above. The voltage drop across the poles 206 and 208 activates the opto-coupler 216, which is connected between the poles 206 and 208. The opto-coupler 216 of the embodiment of FIG. 2 is configured for activation upon a drop in voltage across the poles 206 and 208 of 12 volts or greater. This biasing design, accomplished with opposing zener diodes 218 in series, resists activation of the opto-coupler 216 upon the occurrence of any voltage less than 12 volts. Application of a voltage greater than 12 volts causes activation of the opto-coupler 216, allowing the converter 14 to attempt a telephone call.

As noted above, the function of the check-off-hook circuit 210 is to monitor use of the telephone line 36 so as to avoid any interruption to a communication that may be in progress and connected to wireline unit 18 by way of activation of the converter 14. In addition, particular elements illustrated in FIGS. 3A and 3B were described as an embodiment of the execution of this function. Nonetheless, the present invention may be implemented with other elements that execute this function.

Isolating Transformer, Hybrid Converter, Demodulator, Processor, and Encoder

The off-hook relay circuit 220 is used to connect the transformer 225 to the telephone line 36 whenever the processor 260 needs to send and receive messages from the PSTN __.

The isolating transformer 225 isolates both the telephone line 36 and wireline units 18 which are connected to the converter 14 from interference which may originate with the converter 14. The isolating transformer also may be referred to as a coupling transformer. The isolating transformer 225 is connected to a two-wire to four-wire hybrid converter 230, which is well known to those skilled in telephony techniques. The hybrid converter 230 has one output and one input. The output 232 feeds a modem demodulator ("demodulator") 240, such as a well-known Motorola number MC145447, available from Motorola Inc., Semiconductor Products Sector, Tempe, Ariz.

The input 234 of the hybrid converter 230 feeds a typical and well known dual tone multi-frequency (DTMF) encoder ("encoder") 250, which provides encoding in a well-known manner. Such an encoder may be the Motorola MC 14410, although it will be understood and appreciated by those skilled in the art that demodulating and encoding functions may be performed by a device such as the well known and readily commercially available TriTech model TR89101CS chip, available from TriTech Microelectronics Inc., 1440 McCandless Drive, Melpitas, Calif. 95305.

The encoder 250 is enabled by a signal from the processor 260 delivered via connection 262. The processor 260 may be an Intel model 8051, available from Intel Corporation, 2200 Mission College Blvd., P.O. Box 58119, Santa Clara, Calif. 95952. Bundled four wire connection 264 delivers data from the processor 260 to the encoder 250 in 4-bit binary format. Thereafter, the encoder 250 translates data output from the processor 260 into a format suitable for transmission over the telephone line 36 to the PSTN 40 and to the communications switching center (MSC) 62. As previously discussed, the transmission from the processor 260 comprises a message to the communications switching center including a notification that a subsequent communication directed to the wireless unit 38 be routed to the wireline unit 18. Such transmission from the processor 260 to the communications switching center (MSC) 62 generally takes place upon the occurrence of a triggering event. As described above, such a triggering event may include the detection that the cell phone 38 is connected to its battery charger 30 and therefore connected to the converter 14.

Current Sense Circuit

As noted, the converter 14 makes a detection of the connection of a device such as cell phone 38. Typically, this connection is an intermediate connection because the battery charger 30 of the cell phone 38 is directly connected to the converter 14 and the cell phone 38 is plugged into the battery charger 30 in a conventional manner. In an exemplary embodiment of the present invention, the converter 14 detects the connection of the cell phone 38 by detecting an increase in current drawn through the converter 14 by the battery charger 30 via electrical cord 32 and power plug 34. The increase in current is generated by placing the cell phone 38 on its battery charger 30 and recharging the battery of the cell phone 38. The level of current drawn by the battery charger 30 as it begins to charge the battery of the cell phone 38 increases over the current level drawn by the battery charger 30 prior to attachment of the cell phone 38. The converter 14 detects the increase in current with a current sense circuit 280. Input to the current sense circuit 280 comes from the current source connector 25 such as the AC in plug 25, which may be plugged into a standard 120 volt electrical outlet 26 and provides current from a current source to the converter 14 via electrical cable 24. The current source may be the local power company, a generator, or other current source. The output of the current sense circuit 280 is a device connector such an AC receptacle ("output receptacle") 16 for receiving a mating portion of a power plug 34 of a device such as a battery charger 30.

When the converter 14 is plugged into the electric outlet 26 and a device such as a battery charger 30 is connected to the output receptacle 16, the battery charger 30 itself draws a small amount of current attributable to circuit leakage, operation of status indicators, etc. It is desirable to differentiate between this small, quiescent, amount of current and the current level which indicates the connection of the cell phone 38 to the battery charger 30. The current sense circuit 280 performs this differentiation. In other words, the current sense circuit 280 functions to detect the connection of the cell phone 38 to the battery charger 30 and thereby to the converter 14.

The current sense circuit 280 includes a current sense transformer 282 connected on its input side across power plug 25 and electrical outlet 16. On its output side, the current sense transformer 282 supplies current to a signal processing and amplification device 284. As current is drawn through the current sense circuit 280 of the converter 14, the current sense transformer 282 generates a directly corresponding current flow through its opposing coils 282. The generated current flow is then amplified by a well known signal processing and amplification device 284, which generates a signal corresponding to the current drawn in a well-known manner. The output of the amplification device 284 is provided to a serially connected serial analog-to-digital ("A to D") converter 278. In other words, following amplification, the signal is converted from analog to digital format by a typical 12 bit serial analog-to-digital converter 278. The digital data resulting from the conversion is stored in a non-volatile memory device such as a serial EEPROM 285 for periodic comparison to subsequent current levels which may be generated upon an increased current draw through the current sense circuit 280 of the converter 14.

In the operation of one embodiment of the present invention, the EEPROM 285 records the level of quiescent current drawn by the battery charger 30 before the cell phone 38 is connected thereto. If, after this quiescent current level has been recorded, the cell phone 38 is then connected to the battery charger 30, the cell phone 38 will begin to draw an increased amount of current through the battery charger 30 and, in turn, through the current sense circuit 280. The processor 260 is programmed to compare this increase in drawn current to the quiescent current level stored in the EEPROM 285. When such an increase in drawn current is detected substantially continuously over a predetermined period of time, (typically, 30 seconds), this information is provided to the processor 260 via data link 279. Data link 279 includes clock, data and select lines and is, in essence, a simple communications bus. Utilization of data link 279 in conjunction with serial analog-to-digital converter 286 and EEPROM 285 allows otherwise parallel 12 bit data to be conveyed to the processor in a "clocked" or "serialized" manner along the data line of the data link 279. Such well-known technique conserves input/output pins of the processor 260 for other uses, thereby expanding the functional capacity of the processor 260. The processor responds to the substantially continuously maintained increased current level by transmitting an appropriate message to the memory cell 80 of the CMR system 60. Transmission of the message occurs via the PSTN 40. The message instructs the MSC 62 to route subsequent communications to the predetermined wireline device 18 via the PSTN 40.

As noted, the embodiment illustrated in FIGS. 3A and 3B detects the connection of a device to the converter 14 by detecting a change in the current drawn by the current sense circuit 280 and associated elements of converter 14. This detection of a connection may be accomplished in other manners and with other elements so long as the function is carried out. In particular, current sense circuit may be implemented with different elements or in a different configuration so long as the current sense circuit performs its function in detecting the connection of a device such as the wireless unit to the converter.

Check-Off-Hook and Indicated-Off-Hook Monitor Lines

The processor 260 may also include "check-off-hook" and "indicated-off-hook" lines, 261 and 263, to keep the processor "informed" as to the status of the phone lines. For instance, if the wireline device 18 is off-hook, the converter 14 will not be able to transmit a message to the communications switching center because the check-off-hook circuit 210 is biased to prevent interruption of the ongoing telephone conversation. This biasing, however, does not prevent the processor 260 from continuously attempting to transmit such a message. However, inclusion of check-off-hook and indicated-off-hook lines, 261 and 263, provide information to the processor notifying the processor 260 of the off hook status of wireline device 18 by monitoring the check off hook circuit 210. If the wireline device 18 is off hook, the processor 260 will not attempt to transmit a message.

Alternate Embodiments—Forward/Unforward Switch Features and Do Not Forward Feature Forward Switch Feature An alternate exemplary embodiment of the present invention provides for a converter 14 which can be directed to perform certain supplemental functions manually. For instance, the converter 14 may easily be configured to include a forward switch 276 to implement a forward switch feature. As illustrated in FIG. 3B, the forward switch 276 provides input to processor 260. When the forward switch 276 is active, then the elements of the converter 14 may cooperate to provide a message to the memory cell 80 of the CMR system 60, via the PSTN 40, effectively instructing the MSC 62 to route subsequent communications to the predetermined wireline device 18 via the PSTN 40. In other words, the actuation of this forward switch 276 may accomplish the same forwarding of communications that connection of a wireless unit to the converter 14 accomplishes. Advantageously, this forward switch feature may be used by the user to forward communications at times when the user does not have the cell phone in his or her home or otherwise readily available. For example, a user may have a cell phone that he or she uses in a vehicle and that is relatively difficult or bothersome to remove from the vehicle. With the forward switch feature, the user does not have to remove the cell phone from the vehicle. Rather, the user may simply flip the switch on the converter 14 and subsequent communications are forwarded to the user's designated wireline unit.

The forward switch feature is described above as an adjunct to the other detection mechanisms of the converter 14 such as the current sense circuit 280. Nonetheless, the forward switch feature may be included in a converter 14 without these other detection mechanisms such as the current sense circuit 280.

Unforward Switch Feature

The converter 14 also may be equipped with an unforward switch 277 in order to implement an unforward switch feature. As illustrated in FIG. 3B, the unforward switch 277 provides input to processor 260. When the unforward switch 277 is active, then the elements of the converter 14 may cooperate to provide a message to the memory cell 80 of the CMR system 60, via the PSTN 40. This message effectively instructs the MSC 62 to "un-do" the forwarding of communications predetermined wireline device 18 via the PSTN 40. In other words, this unforward switch feature may be used to terminate forwarding of wireless communications to a wireline device 18. This "un-do" of the forwarding service may be taken advantage of by the user at any point in time without regard to the connection of the cell phone 38 to the converter.

The unforward switch feature is described above as an adjunct to the other detection mechanisms of the converter 14 such as the current sense circuit 280. In addition, the unforward switch feature is described above as an adjunct to the forward switch feature. Nonetheless, the unforward switch feature may be included in a converter 14 without these other detection mechanisms such as the current sense circuit 280, without the forward switch feature, or in any combination thereof Do Not Forward Feature The converter 14 also may be equipped with a do not forward switch 275 in order to implement a do not forward feature. As illustrated in FIG. 3B, the do not forward switch 275 provides input to processor 260. When the do not forward switch 275 is active, then the elements of the converter 14 may cooperate to provide a message to the memory cell 80 of the CMR system 60, via the PSTN 40. Such functionality preemptively prevents transmission of the forwarding message by the converter 14. This operation is distinguishable from the unforward feature previously described, wherein a forwarding message is effectively withdrawn, despite the continued presence of an otherwise triggering current level through the converter 14.

Figure 4:
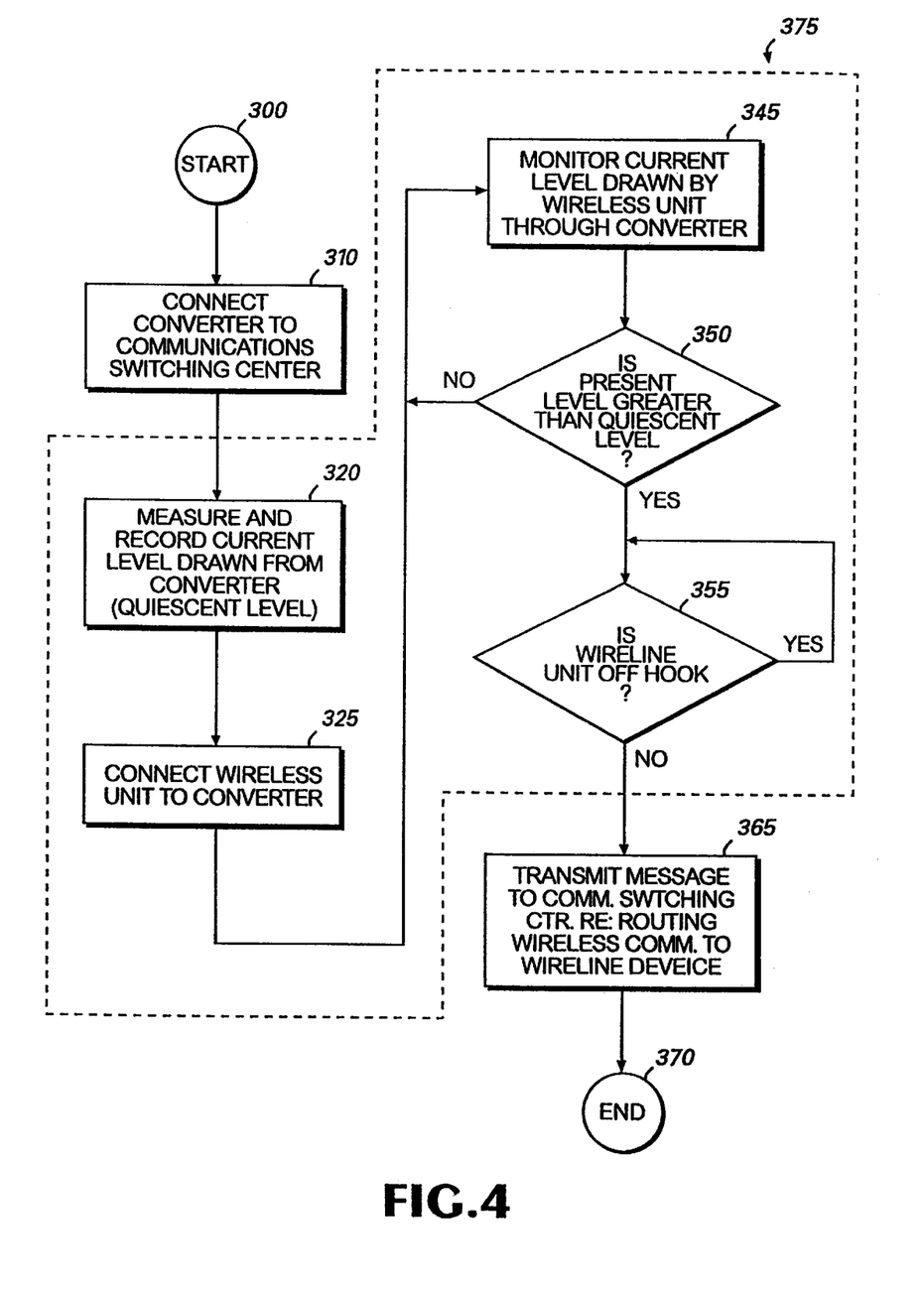
FIG. 4 is a flow chart illustrating an exemplary method of the present invention.

FIG. 4—Flow Diagram Illustrating an Exemplary Embodiment of the Present Invention FIG. 4 is a flow diagram which illustrates a method of communication of an embodiment of the present invention. After starting at step 300, the user installs the converter 14 at step 310. Typically, installation of converter 14 includes the steps of applying power to the converter 14, functionally connecting a wireline unit to the converter 14 and functionally connecting the converter 14 to the PSTN 40. Thereafter, step 320 calls for measuring and recording the current level drawn from the converter 14. In one embodiment of the present invention, this is accomplished after applying power to the converter 14. After the current level drawn from the converter 14 is measured and recorded, a connection is made between a wireless unit 38 and the converter 14, as depicted in step 325.

Step 345 calls for monitoring of the current level drawn by the wireless unit 18 throught the converter 14. Subsequently, in decision block 350, a determination is made as to whether the instant current level is greater than the quiescent level previously measured and recorded in step 320. If the instant current level is not greater than the quiescent level, the monitoring of step 345 is repeated. If the instant current level is greater than the quiescent level, an inquiry is made in decision block 355 as to whether the wireline unit 18 is "off hook". If the wireline unit 18 is off hook, meaning that a wireline device associated with the converter 14 is in use, the step of checking off hook is repeated. If, on the other hand, the wireline unit 18 is not off hook, a message is transmitted to a communications switching center effectively routing subsequent incoming wireless communications to the wireline device 18, as depicted in step 365. Thereafter, the method of an embodiment of the present invention ends at step 370.

Given the foregoing disclosure of the preferred embodiment and design parameters for the present invention, other embodiments of the present invention will suggest themselves to those skilled in the art. More specifically, the steps articulated within the area denoted by the dotted lines and identified by numeral 375 represent only one embodiment of the method of the present invention and are not intended as a limitation of the method of the present invention. Therefore, the scope of the present invention is to be limited only by the claims below.

We claim:

1. A method for registering a wireless unit so that a subsequent communication directed to a wireless number associated with the wireless unit is routed to a directory number associated with a wireline unit, comprising the steps of:
   A. providing a converter having a current source connector and a receptacle;
   B. connecting the converter's current source connector to a current source;
   C. connecting the converter to a communications switching center;
   D. connecting the converter's receptacle to an independent conventional charger;
   E. in response to a draw of current by the wireless unit and the independent conventional charger, when the wireless unit is connected to the independent conventional charger, detecting the current drawn by the wireless unit and the independent conventional charger; and
   F. in response to detecting the current drawn by the wireless unit and the independent conventional charger, transmitting a message to the communications switching center, the message effectively notifying the communications switching center that a subsequent communication directed to the wireless number associated with the wireless unit be routed to the directory number associated with the wireline unit.

2. The method of claim 1, wherein the converter makes the detection of the current being drawn substantially continuously by the wireless unit and the conventional charger over a predetermined period of time.

3. A method of use for a wireless unit so that a subsequent communication directed to a wireless number associated with the wireless unit is routed to a directory number associated with a wireline unit, comprising the steps of:
   A. providing a converter, having a current source connector and a receptacle, that is functionally connected to a communications switching center;
   B. connecting the current source connector of the converter to a current source;
   C. connecting the converter's receptacle to an independent conventional charger associated with the wireless unit;
   D. in response to the connection, detecting a current drawn by the wireless unit and the independent conventional charger; and
   E. in response to detecting a current drawn by the wireless unit and the independent conventional charger, when the wireless unit is connected to the independent conventional charger, transmitting a message to the communications switching center, the message including a notification that the subsequent communication directed to the wireless number associated with the wireless unit be routed to the directory number associated with the wireline unit.

4. The method of claim 3, wherein step D comprises causing the converter to make the detection of the current being drawn substantially continuously by the wireless unit and the conventional charger over a predetermined period of time.

5. A method for notifying a communications switching center so that a subsequent communication directed to a wireless number associated with a wireless unit is routed to a directory number associated with a wireline unit, comprising the steps of:
   A. functionally connecting a converter to a communications switching center;
   B. detecting an actuation of a switch that indicates a connection of the converter to a wireless unit; and
   C. in response to detecting an actuation of a switch, transmitting a message to the communications switching center, the message including a notification that a subsequent communication directed to the wireless number associated with the wireless unit be routed to the directory number associated with the wireline unit.

6. A system for instructing a communications switching center to direct a wireless communication to a directory number associated with a wireline unit, comprising:
   A. a converter functionally connected to the communications switching center, including a current source connector and a receptacle;

B. a current source coupled to the converter's current source connector;

C. an independent conventional charger associated with the wireless unit and connected to the converter's receptacle; and D. the converter further including a detector operative to sense a current draw from the conventional charger and the wireless unit when the wireless unit is connected to the independent conventional charger, and to transmit a message to the communications switching center in response to sensing the current draw, the message including a notification that a subsequent communication directed to a wireless number be routed to the directory number associated with the wireline unit.

7. The system of claim 6, wherein the connection between the converter and the independent conventional charger comprises a connection maintained substantially continuously over a predetermined period of time.

8. The system of claim 6, wherein the association comprises a physical connection between the independent conventional charger and the converter.

9. A converter, independent of a wireless unit base station, configured to instruct a communications switching center to direct a communication intended for a wireless unit to a directory number associated with a wireline unit, comprising:

a current source connector for coupling the converter to a current source;

a receptacle for connecting an electrical device to the converter;

a detector configured to receive a signal from the electrical device when the electrical device is connected to the receptacle; and a processor configured to transmit, in response to the signal, a message to the communication switching center to direct a subsequent communication directed to a wireless number associated with the wireless unit to be routed to the directory number associated with the wireline unit.

10. The converter of claim 9, wherein the detector is further operative to detect an actuation of a switch and provide an indication to the processor to transmit the message for directing the wireless communication.

11. The converter of claim 9, wherein the processor is further operative to differentiate between a first current draw associated with a quiescent current generated by a conventional charger and a second current draw associated with a wireless unit being inserted into the conventional charger.

12. The converter of claim 11, wherein the detector is further operative to detect the electrical device drawing current substantially continuously over a predetermined period of time.

13. The converter of claim 9, wherein the detector is further operative to detect an actuation of a switch to provide a do not forward signal to the processor; and wherein the processor is further operative to respond to the do not forward signal by not transmitting the message to the communications switching center to direct the subsequent communication directed to the wireless number associated with the wireless unit to be routed to the directory number associated with the wireline unit.

14. The apparatus of claim 9, wherein the detector is further operative to detect a disassociation of the electrical device from the converter;

wherein the detector is further operative in response to the detection of the disassociation to provide a disassociation signal to the processor; and wherein the processor is further operative to respond to the disassociation signal by transmitting a disassociation message to the communications switching center, the disassociation message including an instruction to route the subsequent communication directed to the wireless number to the wireless unit.

15. The apparatus of claim 14, wherein the disassociation of the electrical device from the converter comprises actuation of a switch.

16. The method of claim 1, further comprising the step of causing the converter to transmit the message to the communication switching center by detecting an actuation of a switch.

17. The method of claim 1, further comprising the step of causing the converter to differentiate between a first current draw associated with a quiescent current generated by the conventional charger and a second current draw associated with the wireless unit being inserted into the conventional charger.

18. The method of claim 1, further comprising the step of causing the converter to detect a disassociation of the wireless unit from the conventional charger; and causing the converter to respond to the disassociation by transmitting a disassociation message to the communications switching center, the disassociation message including an instruction to route the subsequent communication directed to the wireless number to the wireless unit.

19. The method of claim 18, further comprising the step of causing the converter to detect an actuation of a switch to determine the disassociation of the wireless unit from the conventional charger.

20. The method of claim 1, further comprising the step of causing the converter to detect an actuation of a switch to provide a do not forward signal to the converter; and causing the converter to respond to the do not forward signal by not transmitting the message to the communications switching center to direct the subsequent communication directed to the wireless number associated with the wireless unit to be routed to the directory number associated with the wireline unit.

21. The method of claim 4, further comprising the step of causing the converter to differentiate between a first current draw associated with a quiescent current generated by the conventional charger and a second current draw associated with the wireless unit being inserted into the conventional charger.

22. The method of claim 3, further comprising the step of causing the converter to detect an actuation of a switch to provide a do not forward signal to the converter; and causing the converter to respond to the do not forward signal by not transmitting the message to the communications switching center to direct the subsequent communication directed to the wireless number associated with the wireless unit to be routed to the directory number associated with the wireline unit.

23. The system of claim 6, wherein the converter in response to an actuation of a switch transmits the message to the communications switching center.

24. The system of claim 6, wherein the converter is operative to differentiate between a first current draw associated with a quiescent current generated by the conventional charger and a second current draw associated with the wireless unit being inserted into the conventional charger.

25. The system of claim 24, wherein the converter further detects the current being drawn substantially continuously by the wireless unit and the conventional charger over a predetermined period of time.

26. The system of claim 6, wherein the converter is further operative to detect a disassociation of the wireless unit from the conventional charger; and wherein the converter is further operative to transmit in response to the detection of the disassociation a disassociation message to the communications switching center, the disassociation message including an instruction to route the subsequent communication directed to the wireless number to the wireless unit.

27. The system of claim 26, wherein the disassociation of the wireless unit from the conventional charger comprises actuation of a switch.

28. The system of claim 6, wherein the converter is further operative to detect an actuation of a switch to provide a do not forward signal to the converter; and wherein the converter is further operative to respond to the do not forward signal by not transmitting the message to the communications switching center to direct the subsequent communication directed to the wireless number associated with the wireless unit to be routed to the directory number associated with a wireline unit.

* * * * *